(No Model.)
S. JENKINS.
PIE VENTILATOR.
No. 451,382. Patented Apr. 28, 1891.
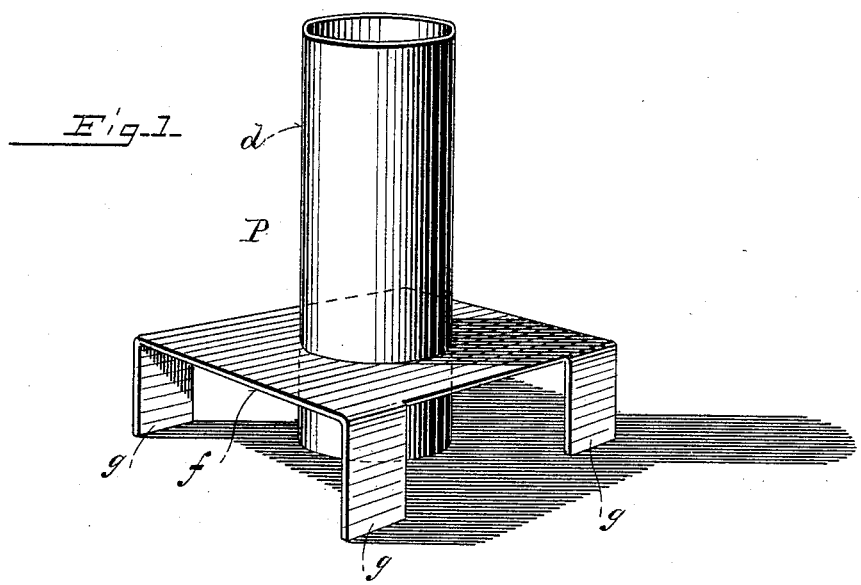
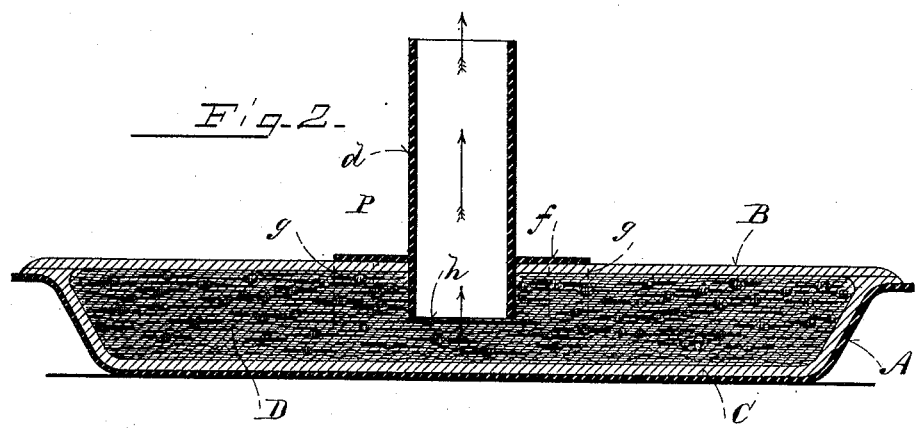

UNITED STATES PATENT OFFICE.

SAMUEL JENKINS, OF AUBURN, MAINE.

PIE-VENTILATOR.

SPECIFICATION forming part of Letters Patent No. 451,382, dated April 28, 1891.

Application filed February 16, 1891. Serial No. 381,627. (No model.)

*To all whom it may concern:*

Be it known that I, SAMUEL JENKINS, of Auburn, in the county of Androscoggin, State of Maine, have invented certain new and useful Improvements in Pie-Ventilators, of which the following is a description sufficiently full, clear, and exact to enable any person skilled in the art or science to which said invention appertains to make and use the same, reference being had to the accompanying drawings, forming part of this specification, in which—

Figure 1 is a perspective view of my improved pie-ventilator, and Fig. 2 a vertical transverse section representing the same in use.

Like letters of reference indicate corresponding parts in the different figures of the drawings.

In cooking pies or similar pastry, particularly when the filling consists of berries, fruit, &c., the juice from the cooking fruit frequently forces itself between the crusts and burns onto the oven-bottom or plate. It is customary, to obviate this, to puncture the upper crust and permit the steam to escape. These perforations rapidly fill and fail to accomplish the desired result.

My invention is designed to obviate this and other objections, and to that end I make use of means which will be readily understood from the following explanation.

In the drawings, A represents the pie-plate; B, the upper crust; C, the under crust, and D the filling or contents.

The ventilator P consists of a section of tin pipe or tubing $d$, provided near its lower end with a horizontally-arranged supporting-plate $f$. Said plate at each corner has a downwardly-projecting vertical lug or ear $g$. These ears may have thinned or knife edges, or may be reduced to a point for penetrating the upper crust B.

In the use of the ventilator it is inserted vertically in the center of the pie through the upper crust. The plate $f$ lies longitudinally in engagement with said crust, its lugs penetrating into the filling, as shown in Fig. 2. Said plate or base $f$ serves to support the ventilator in a vertical position, its lugs preventing lateral movement thereof. The lower end $h$ of the tube, when thus disposed, is at some distance from the bottom crust. Steam from the evaporating juices of the cooking, filling D, passes into the tube $d$ and escapes through the top thereof. Said tube also affords space for the boiling juice, and yet is sufficiently long to prevent the escape thereof. The tube $d$ may be of any suitable form other than cylindrical, if desired.

Having thus explained my invention, what I claim is—

In a pie-ventilator, the cylindrical body $d$, in combination with the supporting-plate $f$, having lugs $g$, arranged substantially as described.

SAMUEL JENKINS.

Witnesses:
 JULIAN J. STEVENS,
 TASCUS ATWOOD.